US007692936B2

(12) United States Patent
Richter

(10) Patent No.: US 7,692,936 B2
(45) Date of Patent: Apr. 6, 2010

(54) MEDIUM FREQUENCY POWER GENERATOR

(75) Inventor: Volkhard Richter, Toenisvorst (DE)

(73) Assignee: HUETTINGER Elektronik GmbH + Co. KG, Freiburg (DE)

(*) Notice: Subject to any disclaimer, the term of this patent is extended or adjusted under 35 U.S.C. 154(b) by 418 days.

(21) Appl. No.: 11/744,543

(22) Filed: May 4, 2007

(65) Prior Publication Data

US 2007/0258274 A1 Nov. 8, 2007

(30) Foreign Application Priority Data

May 5, 2006 (DE) ....................... 10 2006 021 304
May 5, 2006 (EP) ................................ 06 009 300

(51) Int. Cl.
*H02M 3/335* (2006.01)
*H02M 7/5387* (2006.01)

(52) U.S. Cl. ....................... 363/17; 363/132; 363/56.05

(58) Field of Classification Search .................. 363/17, 363/132, 56.05

See application file for complete search history.

(56) References Cited

U.S. PATENT DOCUMENTS 3,775,577 A 11/1973 Peters, Jr.
5,450,305 A * 9/1995 Boys et al. .................... 363/24
5,710,698 A 1/1998 Lai et al.
5,777,299 A * 7/1998 Dominici .................... 219/607
6,898,093 B2 * 5/2005 Ambo et al. ............. 363/56.05
6,906,930 B2 * 6/2005 Jang et al. ...................... 363/17
7,541,791 B2 * 6/2009 Quazi ......................... 323/282
2002/0003139 A1 1/2002 Ohishi et al.
2006/0002158 A1 1/2006 Odell

FOREIGN PATENT DOCUMENTS

| | | |
|---|---|---|
| DE | 2443065 | 1/1976 |
| DE | 44 30078 | 2/1995 |
| EP | 0 975 084 | 1/2000 |
| JP | 04307441 | 10/1992 |

OTHER PUBLICATIONS

Ogiwara et al., "Zero current soft switching mode parallel load resonant tank high-frequency inverter using normally off bipolar mode SIT", Power Electronics Specialists Conference, PESC '94 Record, 25th Annual IEEE Taipei, Taiwan Jun. 20-25, 1994.

Pajic et al., "Unity power factor compensation for pulse burst modulated loads", 2003 IEEE Power Engineering Society, General Meeting, Conference Proceedings, Toronto,. Ontario, Canada, pp. 1274, 1277.

Pressman; "Switching Power Supply Design", 1998, XP002403143.

Pressman, Switching Power Supply Design, 1998, XP002420816.

International Search Report from corresponding European application serial No. EP 06009300.2.

* cited by examiner

*Primary Examiner*—Shawn Riley
(74) *Attorney, Agent, or Firm*—Fish & Richardson P.C.

(57) ABSTRACT

An MF power generator includes a DC current supply connected to an inverter. The inverter includes at least one switching element connected to a first-polarity current supply potential, and an output network. Each switching element is provided with a decoupling circuit for decoupling the switching element from a voltage of the output network. This enables the low-loss switching of the switching elements.

25 Claims, 3 Drawing Sheets

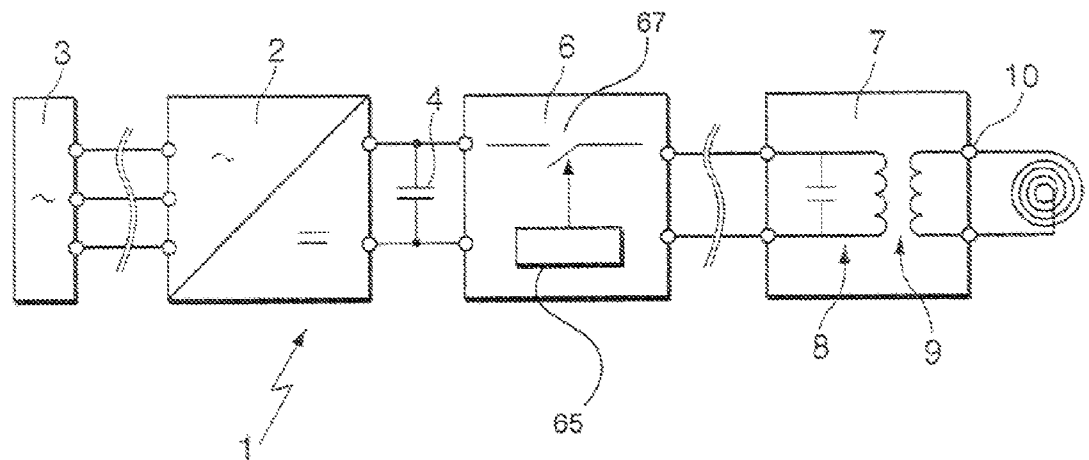
Fig. 1
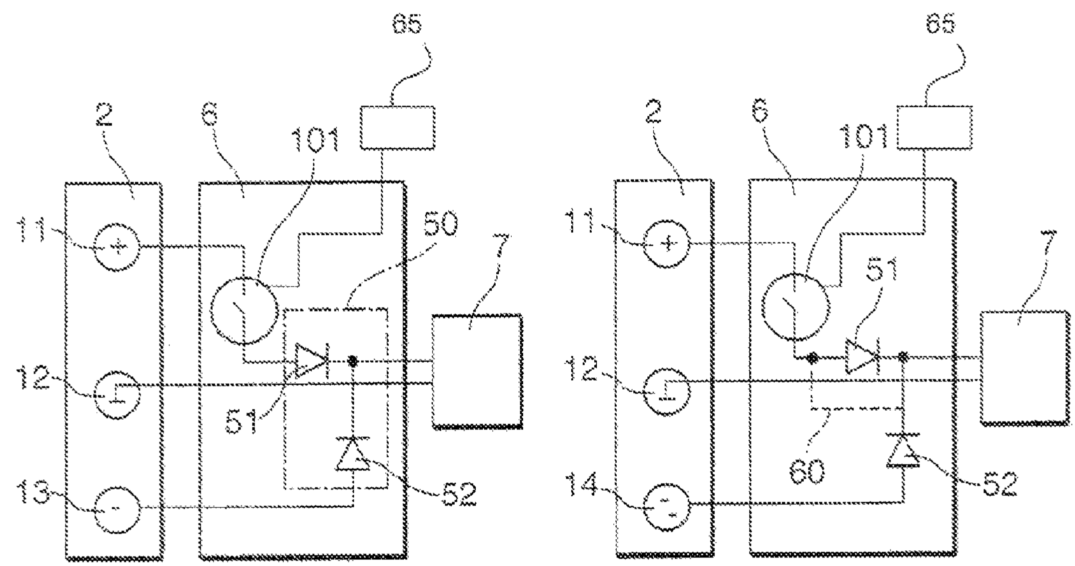
Fig. 2
Fig. 3

MEDIUM FREQUENCY POWER GENERATOR

CROSS REFERENCE TO RELATED APPLICATION

This application claims priority under 35 U.S.C. §119(a) to German Patent Application 10 2006 021 304.1, filed May 5, 2006 and to EP Application No. 06 009 300.2, filed May 5, 2005, the entire contents of which are hereby incorporated by reference.

TECHNICAL FIELD

The invention relates to a medium frequency (MF) power generator, such as for a (vacuum) plasma process or for induction heating.

BACKGROUND

MF power generators, also called MF power supply units, for MF plasma processes or for induction heating usually include an AC/DC converter that converts an a.c. mains voltage into a regulated or an unregulated d.c. voltage. A particular current source characteristic can be realized by way of downstream inductances. The MF power generator also includes an inverter connected to the AC/DC converter, and an output network situated downstream of the inverter. The output network usually consists of an oscillating circuit that can be a parallel or a serial oscillating circuit, and that is usually operated at close to its natural resonance.

Various methods are known for regulating power. One method involves regulating the direct voltage or the direct current. Another method involves regulating power through frequency variation. Since the output network has a resonance frequency, the power in this output network can be increased by approximating the operating frequency to the resonance frequency and vice versa.

In so-called phase-shift methods, switching elements of the inverter are turned in for the maximum possible turn-on time, but the turn-on phases of the switching elements are offset relative to each other to allow the current to flow into the output network for only part of the duration of a half-wave. The phase-shift method presumes a full bridge in the inverter.

Another power regulating method not requiring a full bridge is the pulse-width modulation method (PWM), in which the switching elements of the inverter are turned on for only part of the possible turn-on time. As a result, only some of the power is relayed to the output network. The advantage of this method is that the frequency can remain stable (constant), which is a plus for many processes.

Ideally, no losses arise at the switching element(s) of the inverter, since the voltage at the switching element(s) is equal to zero, and the current is equal to zero in the turned-off state. The turn-on and turn-off steps can be problematic. An existing voltage can be disturbing when turning on the switching elements, since the switching element first remove the voltage, even though current is flowing and voltage is present until then.

SUMMARY

In one general aspect, an MF power generator for induction heating or a plasma process includes a DC current supply, an inverter including at least one switching element connected to a first polarity current supply potential of the DC current supply, and an output network connected to the inverter. The inverter includes a decoupling circuit for each switching element for decoupling the switching element from a voltage of the output network. The decoupling circuit includes a first component connected between the switching element and an input terminal of the output network, and a second component connected between the switching element or the input terminal of the output network and a limiting potential differing from the first polarity current supply potential.

Implementations can include one or more of the following features. The decoupling circuit can include one or more of nonlinear components and active components. The output network can include an output oscillating circuit. The first component can be designed as a diode, and the second component can be designed as a freewheeling diode.

The limiting potential can be a second polarity current supply potential. The limiting potential can be quantitatively larger than the second polarity current supply potential.

The inverter can include a relief circuit for each switching element. The relief circuit can include one or more of nonlinear components and active components. The relief circuit can include a voltage rise delaying arrangement in parallel with the switching element. The voltage rise delaying arrangement can include a capacitor. The relief circuit can include a first active component that is connected between the switching element to be relieved and the limiting potential or the second polarity current supply potential. The first active component can include a transistor. The relief circuit can include a second active component that is connected between the switching element to be relieved and a reference potential. The second active component can include a transistor. The inverter can include a network associated with the second active component.

The DC current supply can be designed as a mains rectifier on a PFC element. The inverter can include a single switching element, a half-bridge with two switching elements, or a full bridge with four switching elements.

The MF power generator can include a controller connected to the switching elements to turn on the switching elements.

In another general aspect, the power of an MF power generator including an inverter that includes at least one activatable switching element and an output network is controlled and/or regulated by operating the switching element in a pulse width modulation method such that the switching element is at least largely decoupled from a voltage of the output network, in that a current direction reversal of the current between the switching element and the output network is prevented.

Implementations can include one or more of the following features. For example, the switching element can be relieved during its switching processes by delaying the voltage rise at the switching element when the switching element is being opened. The switching element can be relieved by reducing the voltage applied to it before the switching element is closed. The switching element can be relieved by reducing the voltage applied to it to about 0 V before the switching element is closed.

The switching element can be operated in the pulse group mode. The pulses in a pulse group can have different lengths. The pulses at the beginning of a pulse group can be longer than the ones at the end of the pulse group.

The method and the MF power generator described herein can enable the use of pulse-width modulation to regulate power.

In one general aspect, the MF power generator includes a decoupling circuit that features a first component connected between the switching element and an input terminal of the output network, and a second component connected between the switching element or input terminal of the output network and a limiting potential differing from the first-polarity current supply potential.

The decoupling circuit can provide a complete or a partial decoupling from a voltage of the output network. If the switching element is closed, the DC supply voltage is present at the output network if no decoupling circuit is used. If the switching element is opened, the voltage at the output network can become larger than the DC supply voltage. In order to avoid switching losses, this high voltage present at the output network should not be present at the switching element while the switching element is being turned on again. The decoupling circuit ensures that the voltage at the switching element can be brought close to 0 V independently of the voltage at the output network.

Decoupling can be realized by controlling the current direction of the current between the switching element and the output network after opening the switching element. The decoupling circuit can be used to ensure that a current direction reversal between the switching element and the output network is prevented if the voltage at the output network becomes larger than the DC supply voltage.

Thus, the decoupling circuit makes it possible to limit the voltage applied to a switching element to a low voltage during turn-on, in particular to about 0 V. As a result, the switching elements can be switched at very low losses, regardless of the prevailing operating parameters of the MF power generator. The output network can include an oscillating circuit that can be a serial oscillating circuit or a parallel oscillating circuit. An output transformer can be part of the oscillating circuit. The leakage inductance of the output transformer can be part of the oscillating circuit inductance. A transformer can also be connected between the inverter and output network independently of the oscillating circuit. The output of the MF power generator is galvanically separated from a mains terminal with a(n output) transformer. In addition, a serial capacitor can be provided at the output of the MF-power generator, which can improve the symmetry of power distribution on both output lines. If the output network includes an oscillating circuit, the decoupling circuit is particularly useful since resonant oscillations can occur in the oscillating circuit that can cause the voltage at the oscillating circuit to become larger than the DC supply voltage.

The first component can decouple the switching element from the voltage of the output network. The second component can be designed as a freewheeling element, so that a current caused by inductances, e.g., line inductances in the line from the inverter to the output network, can continue to be drawn with unchanging current direction with turned off (opened) switching element. The decoupling circuit can include nonlinear and/or active components. Nonlinear components have nonlinear responses, designs, and uses within the circuit, for example, junction diodes, step recovery diodes, thermionic diodes, thyristors, tunnel diodes, and varactor diodes are types of nonlinear components. Conceivable alternatives include inductances that are externally influenced, e.g., by a controller, or knowingly operated at saturation. Active components include switches that are turned on and off for settable times. An active component is one that can be used to provide gain in the circuit, such as, for example, transistors, Bipolar junction transistors, Field effect transistors, MOSFETs, JFETs, and operational amplifiers.

In another implementation, the first component can be designed as a diode, and the second component can be designed as a freewheeling diode. This yields a relatively simple and cost-effective realization of the first and second component.

The MF power generator can include a second-polarity current supply potential as the limiting potential. This means that the switching element can be connected to one current supply terminal, e.g., the positive terminal, while the second component can be connected to the other current supply terminal, e.g., the negative terminal. No further terminal is required for the limiting potential. This yields a simple circuit with few components.

However, there are also advantages to an alternative embodiment, in which the limiting potential is quantitatively greater than the second-polarity current supply potential. This lifts the second component, e.g., a freewheeling diode, to a quantitatively higher voltage. As a result, the inverter can operate as a boost converter. The voltage at the output network can hence assume quantitatively higher voltage values than the voltage used to supply the inverter. This gives the generator an expanded control or regulating range.

In another implementation, a relief circuit can be provided for each switching element. As a result, the voltage at the switching elements can be brought to about 0 V before turn-on, without tangibly influencing the voltage in the output network.

Relief can be realized in particularly simple fashion if the relief circuit comprises nonlinear and/or active components.

Additional advantages can be obtained by providing the relief circuit with a voltage rise delaying arrangement, in particular a capacitor, situated parallel to the switching element. This prevents the switching element from being damaged and reduces losses.

The relief circuit can include a first active component, for example, a transistor, that is connected between the switching element to be relieved and the second-polarity current supply potential. The first active component can also be turned on without any losses if the current flows over the freewheeling diode, since a negligible voltage is then applied to the first active component. Additional components, e.g., a diode, can also be provided between the switching element and the first active component.

The relief circuit can include a second active component, for example, a transistor, that is connected between the switching element to be relieved and a reference potential. The second active component can be used to recharge a capacitor situated in parallel with the switching element. Setting the time difference between the turn-on of the second active component and the turn-off of the first active component makes it possible to adjust how fast and to what voltage the capacitor is recharged. This time is preferably set in such a way that the capacitor always recharges up to 0 V. This enables low-loss switching.

The reference potential can lie between the first and second-polarity current supply potentials. The first and second active components can here be MOSFETs or IGBTs, which can switch currents of up to several 100 amperes.

A further development can provide that a network be allocated to the second active component. This network can include an inductor and a diode, for example. The inductor can be used to recharge the capacitor and set the current rise velocity in the active components.

The DC current supply can be realized in a particularly easy fashion by designing the DC current supply as a mains rectifier or a power factor correction (PFC) element, which are each connected to an a.c. mains voltage. The generated DC-voltage can here be both a constant, regulated voltage as well as an unregulated voltage.

The inverter can include a switching element, a half-bridge with two switching elements, or a full bridge with four switching elements, and the switching elements can be actuated by a controller. The controller can be used to set the pulse width.

The invention also encompasses a method of the kind mentioned at the outset; in this method, a current direction reversal of the current between the switching element and the output network is prevented. Thus, the switching element can be closed with the voltage present at the switching element being close to 0 V, even if the voltage at the output network is larger than the DC supply voltage.

In another implementation, the switching element is operated in the pulse group mode. This makes it possible to use smaller inductances even at low frequencies. The pulses in a pulse group can have different or varying lengths. If the pulses at the beginning of a pulse group are longer than the ones at the end of the pulse group, it is possible to allow the current between the switching element and the output network to rise rapidly, and remain roughly constant for the remaining time (that is, for the duration of the pulse group).

A preferred method variant can provide that the switching element be relieved during its switching processes by delaying the voltage rise on the switching element while opening the switching element. This enables a reduction in losses when opening the switching element.

The switching element can be relieved by reducing the voltage applied thereto before closing the switching element, in particular to about 0 V. This also permits a nearly loss-free closing of the switching element.

This method for controlling power is relatively inexpensive and does not require the use of boost converters or buck converters.

Further features and advantages are obtained from the following description with reference to the figures in the drawings, which show details, and from the claims. The features mentioned above and below can be utilized individually or collectively in arbitrary combination. The embodiments shown and described are not to be understood as exhaustive enumeration but have exemplary character for describing the invention.

DESCRIPTION OF THE DRAWING

FIG. 1 is a diagrammatic view of an MF power generator;

FIG. 2 is a diagrammatic view of part of an MF power generator with an inverter, which includes one switching element, without separate limiting voltage potential;

FIG. 3 is a diagrammatic view of part of an MF power generator with an inverter, which includes one switching element, with separate limiting voltage potential;

DETAILED DESCRIPTION

Figure 4:
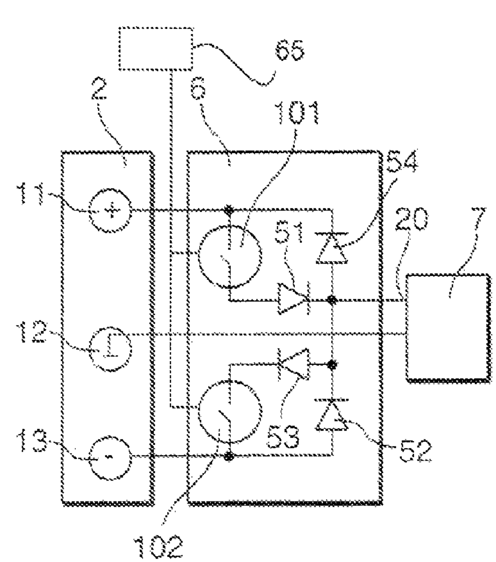
FIG. 4 is a diagrammatic view of part of an MF power generator with an inverter, which includes two switching elements, without separate limiting voltage potential.

The MF power generator 1 shown in FIG. 1 includes an AC/DC converter as the DC current supply 2, which is connected to an a.c. mains supply 3. An inverter 6 is connected to the DC current supply 2. The inverter 6 includes one or more switching elements 67 within the line from the DC current supply 2 to the output network 7. Additionally, the MF power generator 1 includes a controller 65 that is coupled to the one or more switching elements 67 for controlling operation of the one or more switching elements 67. The controller 65 can be internal to the inverter 6, as shown in FIG. 1, or it can be external to the inverter 6 (as shown in FIGS. 2-6). A capacitor 4 can be connected between the terminals of the current supply 2.

The MF power generator also includes an output network 7 connected to the inverter 6 to produce an output 10. The output network 7 includes an oscillating circuit 8 and an output transformer 9. The oscillating circuit 8 can be a serial oscillating circuit or a parallel oscillating circuit (as shown). The leakage inductance of the output transformer 9 can be a part of the oscillating circuit inductance. The output 10 of the MF power generator 1 is galvanically isolated from the a.c. mains supply 3 by the use of the output transformer 9.

As an alternative to or in addition to the use of an output transformer 9 within the output network 7, a transformer can be connected between the inverter 6 and the output network 7.

FIG. 2 shows an implementation of the DC current supply 2 and the inverter 6. The DC current supply 2 includes a reference potential 12, a first-polarity current supply potential 11 (that is positive relative to the reference potential 12), and a second-polarity current supply potential 13 (that is negative relative to the reference potential 12). The inverter 6 includes a switching element 101 that is connected to the first-polarity current supply potential 11. A current can flow over the output network 7 to the reference potential 12 if the switching element 101 is closed.

The inverter 6 also includes a decoupling circuit 50 that decouples the switching element 101 from the output network 7. The decoupling circuit 50 includes a first component 51 designed, for example, as a diode, and a second component 52 designed, for example, as a diode (such as a freewheeling diode). The first component 51 is connected between the switching element 101 and an input terminal of the output network, and the second component 52 is connected between the input terminal of the output network 7 and the second-polarity current supply potential 13.

The first component 51 can be a diode that decouples the switching element 101 from the voltage of the output network 7. The second component 52 can be designed as a freewheeling element in that a current caused by inductances (for example, line inductances in the line from the inverter 6 to the output network 7) can continue to be drawn with unchanging current direction with a turned off (that is, open) switching element 101.

As shown, the controller 65 is connected to the switching element 101 to control and turn on the switching element.

FIG. 3 shows another implementation of the DC current supply 2 and the inverter 6 that essentially corresponds to the implementation shown in FIG. 2, except that the DC current supply 2 includes a limiting potential 14 that is quantitatively larger than the second polarity current supply potential and is the negative potential in comparison to the reference potential 12, and the second component 52 is connected to the limiting potential 14. The second component 52 can be connected between the input terminal of the output network 7 and the first component 51. As an alternative, however, the second component 52 can be connected between the first component 51 and the switching element 101, as denoted by the dotted line 60. As in the design shown in FIG. 2, the first component 51 is connected between the switching element 101 and the input terminal of the output network 7. As shown, the controller 65 is connected to the switching element 101 to control and turn on the switching element.

FIG. 4 shows another implementation of the DC current supply 2 and the inverter 6. In this implementation, the DC current supply 2 includes a current supply potential 11 and a current supply potential 13. The inverter 6 includes a half-bridge having two switching elements 101, 102. In this case, the first component 51 and the second component 52 represent the decoupling circuit for the first switching element 101, and a first component 53 and a second component 54 represent the decoupling circuit for the switching element 102. The second components 52, 54 are each connected to a current supply potential 11, 13, respectively, and the current supply potential 11 represents the first polarity current supply potential and the current supply potential 13 represents the second polarity current supply potential for the switching element 101 and the associated relief circuit. Correspondingly, the current supply potential 13 represents the first polarity current supply potential and the associated relief circuit, and the current supply potential 11 represents the second polarity current supply potential for the switching element 102. As shown, the controller 65 is connected to the switching elements 101 and 102 to control and turn on the switching elements 101, 102.

In order to relieve the switching elements 101, 102, for example, for zero voltage switching, it is advantageous to bring the voltage at the switching elements 101, 102 to 0 V without tangibly influencing the voltage at the output network 7 in the process. Toward this end, it is advantageous to decouple the switching element 101 from the output network 7 using the first component 51, and to decouple the switching element 102 from the output network 7 with the first component 53. However, inductances, such as the line inductances in the lines between the inverter 6 and the output network 7, can continue to draw current even with the switching element 101 (and the switching element 102) turned off. For this reason, the second components 52, 54, which are designed as freewheeling diodes, are provided between an input terminal 20 of the output network 7 and the first or second polarity current supply potentials 11, 13. Thus, the current can be relayed through the second component 52 when turning off the switching element 101, and the current can be relayed through the second component 54 when turning off the switching element 102. The second components 52, 54 are freewheeling diodes in that they are connected parallel to an inductive load such that they are reverse biased by the supply voltage. When the DC supply voltage is turned off a voltage spike with reverse polarity occurs in the inductive load due to self-induction, which is then short-circuited by way of the second components 52, 54.

Figure 5:
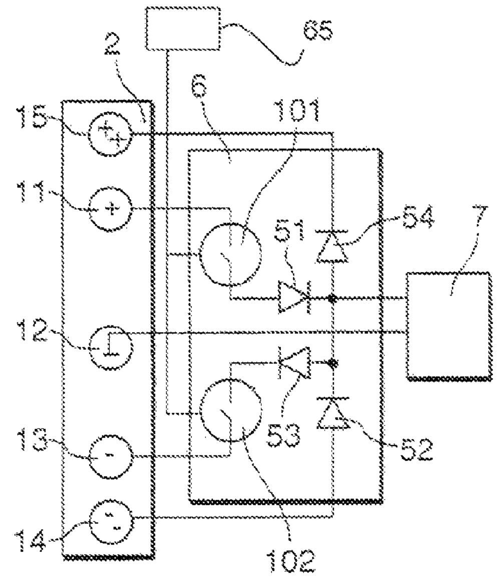
FIG. 5 is a diagrammatic view of part of an MF power generator with an inverter, which includes two switching elements, with separate limiting voltage potential.

Similarly to FIG. 3, the arrangement in FIG. 5 shows another implementation of the DC current supply 2 and the inverter 6. In this implementation, the DC current supply 2 includes limiting potentials 14, 15 to which the second components 52, 54 are connected. In this way, the inverter 6 can be operated as a boost converter. Additionally, the controller 65 is connected to the switching elements 101 and 102 to control and turn on the switching elements 101, 102.

Figure 6:
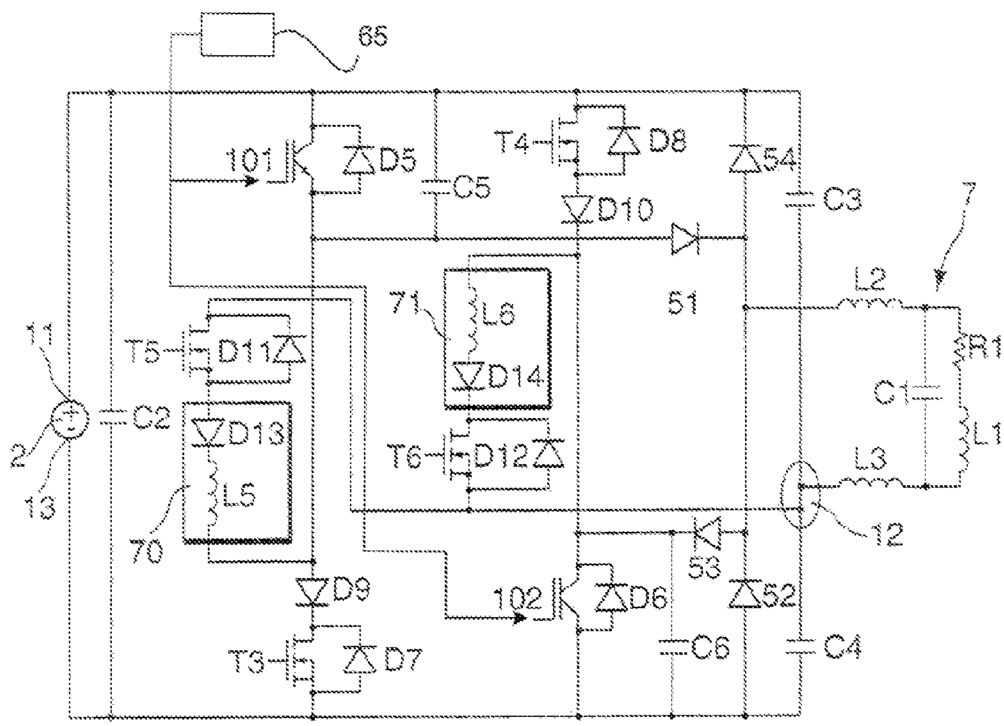
FIG. 6 is a circuit diagram of an MF power generator.

FIG. 6 shows a circuit diagram of an implementation of the inverter 6 and the connected output network 7. The switching relief for the switching element 101 will be described below; switching relief takes place analogously for the switching element 102.

The inverter 6 includes the switching elements 101, 102; an intrinsic (or body) diode D5 in the switching element 101; an intrinsic (or body) diode D6 in the switching element 102; the first components 51, 53; the second components 52, 54; first and second active components T3 and T5 for the switching element 101; first and second active components T4 and T6 for the switching element 102; an intrinsic (or body) diode D7 of the first active component T3; an intrinsic (or body) diode D8 of the first active component T4; an intrinsic (or body) diode D11 of the second active component T5; an intrinsic (or body) diode D12 of the second active component T6; a network 70 connected to a source of the second active component T5; a network 71 connected to a drain of the second active component T6; voltage rise delaying arrangement C5 for the switching element 101; voltage rise delaying arrangement C6 for the switching element 102; and capacitors C3 and C4; a diode D9 connected to a drain of the first active component T3; and a diode D10 connected to a source of the first active component T4.

The voltage rise delaying arrangement C5 or C6 can be a capacitor that prevents the respective switching element 101, 102 from being damaged and reduces losses.

The first active component T3 can be, for example, a transistor such as a MOSFET or an IGBT that is connected between the switching element 101 and the second-polarity current supply potential 13. The first active component T3 can also be turned on without any losses if the current flows over the freewheeling diode 52 since a negligible voltage would be applied to the first active component T3. The first active component T4 can be, for example, a transistor such as a MOSFET or an IGBT that is connected between the switching element 102 and the current supply potential 11, which is the second-polarity potential for the switching element 102.

The second active component T5 can be, for example, a transistor such as a MOSFET or an IGBT that is connected between the switching element 101 and a reference potential 12. The second active component T5 can be used to recharge a capacitor situated parallel to the switching element 101, in this case, C5. The reference potential 12 can lie between the first and second-polarity current supply potentials 11, 13. The second active component T6 can be, for example, a transistor such as a MOSFET or an IGBT that is connected between the switching element 102 and the reference potential 12.

The time difference between the turn-on of the second active component T5 and the turn-off of the first active component T3 can be adjusted to adjust how fast and to what voltage the capacitor C5 is recharged. This time difference can be set in such a way that the capacitor C5 always recharges up to 0 V to enable low-loss switching.

As shown, the controller 65 is connected to the switching elements 101 and 102 (for example, the gates of the switching elements 101, 102) to control and turn on the switching elements 101, 102. Additionally, the controller 65 can be connected to one or more other components of the inverter 6, including, for example, active components T3, T4, and T5, to control such components. In this case, the controller 65 would be connected to the gates of such active components.

At time t1, the switching element 101 is turned off, i.e., it is opened, and a current is prevented from flowing through the switching element 101. The current further drawn in the lines to the output network 7 by line inductances L2, L3 is commutated to the voltage rise delaying arrangement C5, which is designed as capacitor (e.g., 100 nF). This prevents a rapid rise in voltage dU/dt at the switching element 101. The voltage rise delaying arrangement C5 is charged until the second component 52 designed as a freewheeling diode becomes conductive. The first active component T3 can now be turned on without any losses, since the voltage here is also nearly equal to 0 V. The current through the line inductances L2, L3 has continuously dropped since the switching element 101 was turned off, until finally reaching 0 A. At this point, the voltage over the line inductances L2 and L3 also drops to 0 V. Since the point when the second component 52 became conductive and passed current through line inductances L2, L3, the first component 51 has had time to permit recombination, since no voltage was applied anymore. Components 51, 52 begin to block, when the current through line inductances L2, L3 would pass through zero and a current reversal would take place.

The following describes the terminating of the blocking phase of the switching element 101. The first active component T3 remains closed (conductive) and the second active component T5 is turned on (closed). The second active component T5 has allocated to it the network 70, which includes a diode D13 and an inductance L5 in this example. The current in both active components T3, T5 rises linearly (not necessarily slowly, since the inductance L5=250 nH, for example), since the inductance L5 is connected in series with the second active component T5. Once sufficient energy has been stored in the inductance L5 for the ensuing process, the first active component T3 is turned off, and the current driven by inductance L5 now recharges the voltage rise delaying arrangement C5, which is designed as a capacitor, in a reverse direction. The recharging process is an oscillation arising from the natural resonance of the oscillating circuit with the components C5 and L5. Therefore, the oscillation is sinusoidal.

The rate at which and voltage to which the voltage rise delaying arrangement C5 is recharged can be controlled by adjusting the time between the turn-on of the second active component T5 and the turn-off of the first active component. This time is preferably set in such a way that the charge on C5 is changed such that the potential is 0 V under all circumstances. Excess energy is reduced by making the intrinsic diode D5 conductive. As soon as voltage applied to the voltage rise delaying arrangement C5, and hence to the switching element 101, measures 0 V, the switching element 101 is turned on with virtually no losses.

The capacitors C3 and C4 are used to generate the reference potential 12. The DC current supply 2 generates an intermediate circuit voltage UZ between the current supply potentials 11, 13. The capacitance of the capacitors C3 and C4 can be equal. In this case, the reference potential 12 can be made to equal UZ/2 by using the capacitors C3, C4 of the same capacitance and a pulse duty factor exhibiting the same duration for the switching elements 101 and 102.

Due to the voltage difference between UZ and UZ/2, the current in the inductance L5 keeps decreasing down to 0 A, after which the (quick) diode D13 blocks. At this point, the second active component T5 can also be blocked.

The diode D9 prevents the freewheeling current from flowing over the first active component T3, the diode D7, or the first component 51 instead of over the second component 52.

For the switching element 102, a first active component T4 and a second active component T6 with allocated network 71 are provided for relief purposes and in the same manner as discussed above with respect to the switching element 101.

In order to decouple or relieve the first switching element 101, the first polarity current supply potential is current supply potential 11, and the second polarity current supply potential is current supply potential 13. In order to decouple or relieve the second switching element 102, the first polarity current supply potential is the current supply potential 13, and the second polarity current supply potential is current supply potential 11.

The diodes D5, D6, D7, D8, D11, D12 are the intrinsic or body diodes that are anti-parallel to the switching elements 101, 102 or to the active components T3, T4, T5, T6, respectively.

The active components T3, T4, T5, T6 in conjunction with C5, C6, L5, L6, D13, D14, D9, and D10 are used to relieve the switching elements 101, 102; the circuit including T3, T5, C5, L5, and D13 represents a relief circuit for the switching element 101; and the circuit including T4, T6, C6, L6, and D14 represents a relief circuit for the switching element 102.

Figure 7A:
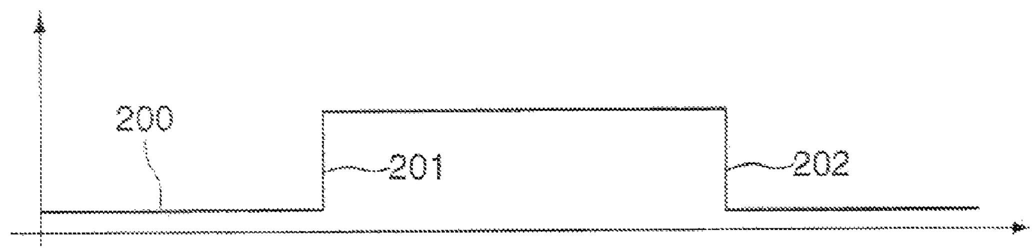
FIG. 7*a* is a graph of an activation signal to a switching element of the inverter of FIG. 6 versus time.

FIG. 7*a*-7*d* again illustrate the progressions in FIG. 6. FIG. 7*a* shows the activation signal 200 for the switching element 101. The switching element 101 is closed at the rising edge 201, and the switching element 101 is opened at the falling edge 202 (which is at time t1).

Figure 7B:
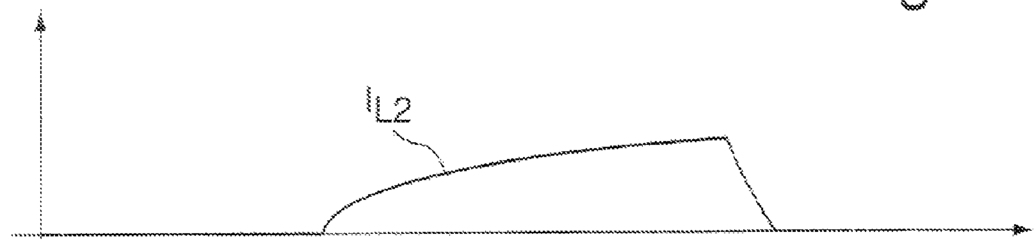
FIG. 7*b* is a graph of current through a line inductance of an output network of the MF power generator of FIG. 6 versus time for the activation signal of FIG. 7*a;*

FIG. 7*b* shows a current $I_{L2}$ in the inductance L2 that arises as the result of turning on and off the switching element 101. The current $I_{L2}$ rises slowly when the switching element 101 (rising edge 201) is turned on, and again falls when the switching element 101 is turned off (falling edge 202). To prevent the current from rising too fast and exceeding the load limits of the components, for example, during long turn-on times, the inductances L2 and L3 should be sufficiently large. At low frequencies, large and expensive inductances might have to be provided additionally. If this is not desired, operating the switching elements 101, 102 in the pulse group mode makes it possible to use the same structural design for low frequencies as for high frequencies, and relatively small inductances L2, L3 can be used. Some time after the first switching element 101 has been turned off (falling edge 202), the switching element 102 is turned on, resulting in a corresponding current progression $I_{L2}$.

Figure 7C:
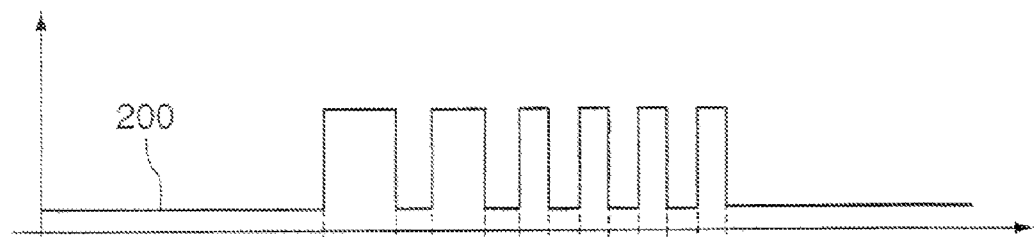
FIG. 7*c* is a graph of a driving signal to a switching element of the inverter of FIG. 6 versus time.
Figure 7D:
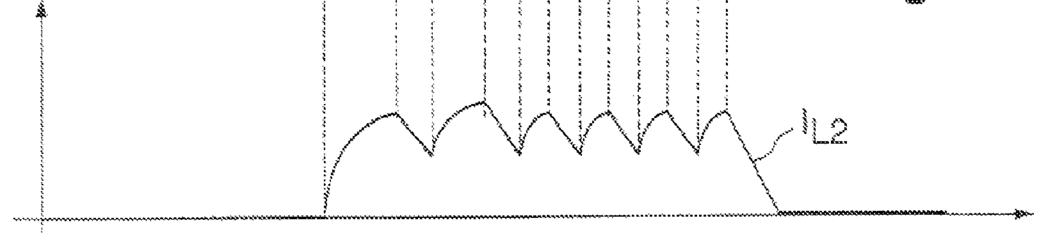
FIG. 7*d* is a graph of current through a line inductance of an output network of the MF power generator of FIG. 6 versus time for the driving signal of FIG. 7*c.*

FIG. 7*c* shows the activation signal 200 of the switching element 101 in the pulse group mode (switching element 102 also remains open during the off phases). FIG. 7*d* shows the corresponding reaction of the current $I_{L2}$. The inductances L2 and L3 are distinctly smaller than the inductances used to generate the current in FIG. 7*b*, as evident from the steeper curves shown in FIG. 7*d* (which results because the inductance is smaller). If these inductance values were used and the switching element 101 were left turned on for the entire time as shown in FIG. 7*a*, the current could rise over the limits of permissible inverter operating conditions. The individual pulses in the pulse group need not be identical in duration; in particular, it is often advantageous to select the initial turn-on times to be longer than the subsequent ones, allowing current $I_{L2}$ to rise rapidly, and remain roughly constant for the remaining time.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An MF power generator for induction heating or a plasma process, the MF power generator comprising:

a DC current supply;

an inverter comprising at least one switching element connected to a first polarity current supply potential of the DC current supply; and an output network connected to the inverter;

wherein the inverter comprises a decoupling circuit for each switching element for decoupling the switching element from a voltage of the output network;

wherein the decoupling circuit comprises:

a first component connected in series between the switching element and an input terminal of the output network; and a second component connected between the switching element or the input terminal of the output network and a limiting potential differing from the first polarity current supply potential.

2. The MF power generator of claim 1, wherein the decoupling circuit comprises one or more of nonlinear components and active components.

3. The MF power generator of claim 1, wherein the output network includes an output oscillating circuit.

4. The MF power generator of claim 1, wherein the first component is designed as a diode, and the second component is designed as a freewheeling diode.

5. The MF power generator of claim 1, wherein the limiting potential is a second polarity current supply potential.

6. The MF power generator of claim 1, wherein the limiting potential is quantitatively larger than a second polarity current supply potential.

7. The MF power generator of claim 1, wherein the inverter comprises a relief circuit for each switching element.

8. The MF power generator of claim 7, wherein the relief circuit comprises one or more of nonlinear components and active components.

9. The MF power generator of claim 7, wherein the relief circuit includes a voltage rise delaying arrangement in parallel with the switching element.

10. The MF power generator of claim 9, wherein the voltage rise delaying arrangement includes a capacitor.

11. The MF power generator of claim 7, wherein the relief circuit comprises a first active component that is connected between the switching element to be relieved and the limiting potential or the second polarity current supply potential.

12. The MF power generator of claim 11, wherein the first active component includes a transistor.

13. The MF power generator of claim 7, wherein the relief circuit comprises a second active component that is connected between the switching element to be relieved and a reference potential.

14. The MF power generator of claim 13, wherein the second active component includes a transistor.

15. The MF power generator of claim 13, wherein the inverter comprises a network associated with the second active component.

16. The MF power generator of claim 1, wherein the DC current supply is designed as a mains rectifier or a PFC element.

17. The MF power generator of claim 1, wherein the inverter comprises a single switching element, a half-bridge with two switching elements, or a full bridge with four switching elements.

18. The MF power generator of claim 1, further comprising a controller connected to the switching elements to turn on the switching elements.

19. A method for controlling and/or regulating the power of an MF power generator comprising an inverter that includes at least one activatable switching element and an output network, the method comprising operating the switching element in a pulse width modulation method such that the switching element is at least largely decoupled from a voltage of the output network, in that a current direction reversal of the current between the switching element and the output network is prevented.

20. The method of claim 19, further comprising relieving the switching element during its switching processes by delaying the voltage rise at the switching element when the switching element is being opened.

21. The method of claim 19, further comprising relieving the switching element by reducing the voltage applied to it before the switching element is closed.

22. The method of claim 21, wherein relieving the switching element comprises relieving the switching element by reducing the voltage applied to it to about 0 V before the switching element is closed.

23. The method of claim 19, wherein the switching element is operated in the pulse group mode.

24. The method of claim 23, wherein the pulses in a pulse group have different lengths.

25. The method of claim 24, wherein the pulses at the beginning of a pulse group are longer than the ones at the end of the pulse group.

* * * * *